US009995326B2

(12) United States Patent
Di Monte (10) Patent No.: US 9,995,326 B2
(45) Date of Patent: Jun. 12, 2018

(54) APPARATUS FOR SECURING OBJECTS (71) Applicant: Michael Anthony Di Monte, Cream Ridge, NJ (US)

(72) Inventor: Michael Anthony Di Monte, Cream Ridge, NJ (US)

( * ) Notice: Subject to any disclaimer, the term of this patent is extended or adjusted under 35 U.S.C. 154(b) by 0 days. days.

(21) Appl. No.: 15/161,229

(22) Filed: May 21, 2016

(65) Prior Publication Data
US 2017/0335871 A1  Nov. 23, 2017

(51) Int. Cl.
*F16B 2/22* (2006.01)
*A47B 81/00* (2006.01)
*F16M 13/02* (2006.01)

(52) U.S. Cl.
CPC .............. *F16B 2/22* (2013.01); *A47B 81/00* (2013.01); *F16M 13/02* (2013.01)

(58) Field of Classification Search
CPC ........... F16B 2/22; A47B 81/00; A47F 7/0028
USPC ................................................ 211/85.13, 69
See application file for complete search history.

(56) References Cited

U.S. PATENT DOCUMENTS

| 2,029,043 | A | * | 1/1936 | Wendell | A01G 5/04 24/5 |
| 2,278,075 | A | * | 3/1942 | Hecht | A47K 10/14 248/205.5 |
| 2,339,187 | A | * | 1/1944 | Pain | A47K 10/14 248/314 |
| 2,513,846 | A | * | 7/1950 | Collins | A47K 10/14 248/314 |
| 3,326,509 | A | * | 6/1967 | Kuttler | F16B 21/20 248/176.1 |
| 3,365,761 | A | * | 1/1968 | Kalvig | B25H 3/04 211/65 |
| 3,375,934 | A | * | 4/1968 | Bates | B01L 9/06 211/72 |
| 3,603,551 | A | * | 9/1971 | Peterson | A47F 7/0028 211/70.6 |
| 3,899,100 | A | * | 8/1975 | Rigaud | B65D 51/00 138/89 |
| 4,138,055 | A | * | 2/1979 | Harrison | B42D 17/00 232/1 C |
| 4,189,808 | A | * | 2/1980 | Brown | B65D 33/1625 24/30.5 L |
| 4,267,995 | A | * | 5/1981 | McMillan | H02G 3/32 174/153 G |
| 4,357,740 | A | * | 11/1982 | Brown | B65D 33/1625 24/30.5 S |
| 4,600,112 | A | * | 7/1986 | Shillington | A61M 5/3205 206/366 |
| 4,644,610 | A | * | 2/1987 | Fish | A01G 13/04 211/70.6 |
| 4,697,312 | A | * | 10/1987 | Freyer | B65D 33/1625 24/30.5 R |

(Continued)

Primary Examiner — Stanton L Krycinski (57) ABSTRACT

An object holding device comprises at least two gripping lips, at least one supporting wall for each of at least two gripping lips, one base, wherein at least two gripping lips are respectively opposed to one another, wherein the at least two gripping lips form at least one slit between one another, wherein each the at least one supporting wall is attached with one of the at least two gripping lips and extends to the base, at least one crease is formed in the approximately middle of each supporting wall, wherein the crease forms an angle of about 30 degrees to about 90 degrees relatively to the base, wherein the at least two gripping lips, the at least one supporting wall for each of the at least two gripping lips, and the base together define a space to receive the at least one object.

17 Claims, 8 Drawing Sheets

(56) References Cited

U.S. PATENT DOCUMENTS

| | | | | |
|---|---|---|---|---|
| 4,914,789 | A * | 4/1990 | Pedersen | B65D 33/1625 24/30.5 S |
| 5,381,588 | A * | 1/1995 | Nelson | B65D 73/0064 24/30.5 S |
| 5,685,438 | A * | 11/1997 | Emanuel | A47F 7/0028 206/486 |
| 6,029,829 | A * | 2/2000 | Ovadia | A47F 7/02 206/566 |
| 6,161,263 | A * | 12/2000 | Anderson | A41B 11/002 24/30.5 S |
| 6,349,827 | B1 | 2/2002 | Feder | |
| 6,769,555 | B2 * | 8/2004 | Brady | A47F 7/12 211/113 |
| 7,234,199 | B2 * | 6/2007 | Bushey | A47B 91/06 16/42 R |
| D599,074 | S * | 8/2009 | Bizzell | B65F 1/06 D34/10 |
| 7,641,835 | B2 * | 1/2010 | Ramsey | B65F 1/06 220/495.08 |
| 7,766,168 | B2 * | 8/2010 | Thrapp | A45F 5/021 206/315.11 |
| 8,528,171 | B2 * | 9/2013 | Walker | B65H 75/362 24/115 A |
| 9,416,804 | B2 * | 8/2016 | Simakis | F16B 2/22 |
| 2008/0256759 | A1 * | 10/2008 | Kasbohm | B65F 1/06 24/30.5 S |
| 2011/0146012 | A1 * | 6/2011 | Hirst | A61L 2/18 15/104.93 |
| 2016/0114739 | A1 * | 4/2016 | Korber | F16B 21/075 24/292 |

* cited by examiner

APPARATUS FOR SECURING OBJECTS

CROSS-REFERENCE RELATED TO RELATED APPLICATIONS

N/A

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Sharp tools like drill bits, knifes, etc. pose a threat to the user. In most carriers and holding containers, such as a tool box, there is no place to secure the sharp objects and when digging around in the tool box they can cut themselves looking for the tools they need. Also tool boxes do not provide organized compartments for each tool with different shapes the only type of tool carrier offered is a pouch type which is normally made of fabric material that easily rips or rips overtime. Furthermore, if a tool box full of tools falls down a flight of stairs then all or many of the tools fall out with it.

Some prior arts, such as U.S. Pat. No. 6,349,827 B1 tried to provide storage and arrangement for securing tools having a cylindrical shaft. The problem with such prior art or similar inventions is that the size of slots and channels to receive tools needs to be precisely predetermined in order to fit with various sizes of tools to be inserted into the slots and channels. The user of such tool storage device also needs to carefully match the size of the tool to the size of slots that are precisely matched the diameter of the tool. If the size of the slot is not matched with the diameter of the tool, the tool will either fall out of the storage device or get stuck in a slot much smaller than the diameter of the tool.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and is directed to an object holding device holding at least one object comprises at least two gripping lips, at least one supporting wall for each of said at least two gripping lips, one base, wherein said at least two gripping lips are respectively opposed to one another, wherein each of said at least two gripping lips further comprises a first end and a second end in opposite to said first end, wherein said at least two gripping lips are touched against one another, wherein said first end of one of said at least two gripping lips is affixed with said second end of another said at least two gripping lips, wherein said at least two gripping lips form at least one slit between one another, wherein each said at least one supporting wall has a first side attached with one of said at least two gripping lips and has a second side extending to said base, wherein each of said at least one supporting wall for each of said at least two gripping lips has at least one crease formed in the approximately middle of said at least one supporting wall for each of said at least two gripping lips, wherein said at least one crease of said at least one supporting wall for each of said at least two gripping lips extends from said first side of said at least one supporting wall to said second side of said at least one supporting wall, wherein said crease forms an angle of about 30 degrees to about 90 degrees relatively to said base, wherein said at least two gripping lips, said at least one supporting wall for each of said at least two gripping lips, and said base together define a space to receive said at least one object, wherein said at least two gripping lips and said at least one supporting wall for each of said at least two gripping lips are made of resilient flexible material, wherein said at least one object can be disposed into said space, wherein a portion of said at least one object can be disposed through said slit formed between said at least two gripping lips, and wherein said at least two gripping lips hold a portion of said object between said slit.

BRIEF DESCRIPTION OF THE DRAWINGS

It should be understood that the drawings are merely representative, are not necessarily drawn to scale, and are not intended to limit the subject matter of this application.

DETAILED DESCRIPTION

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Figure 1:
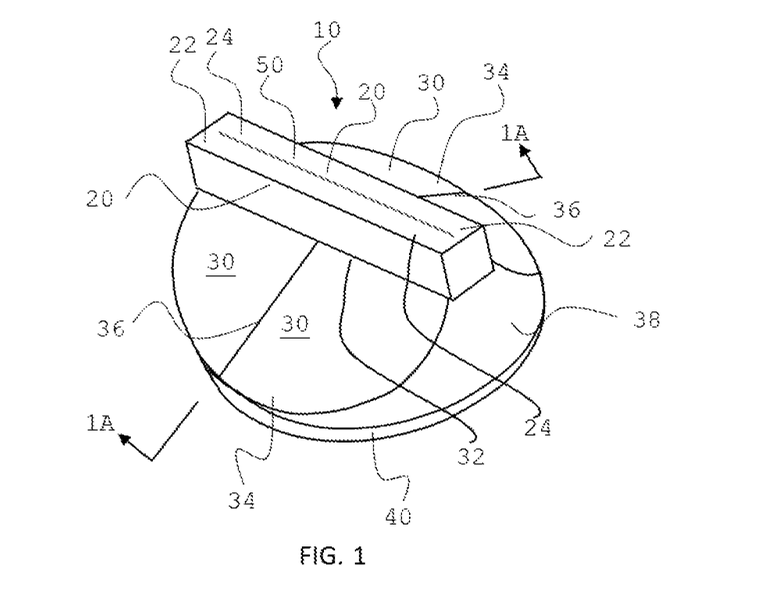
FIG. 1 is a perspective view of one embodiment with 2 gripping lips of the object holding device.
Figure 1A:
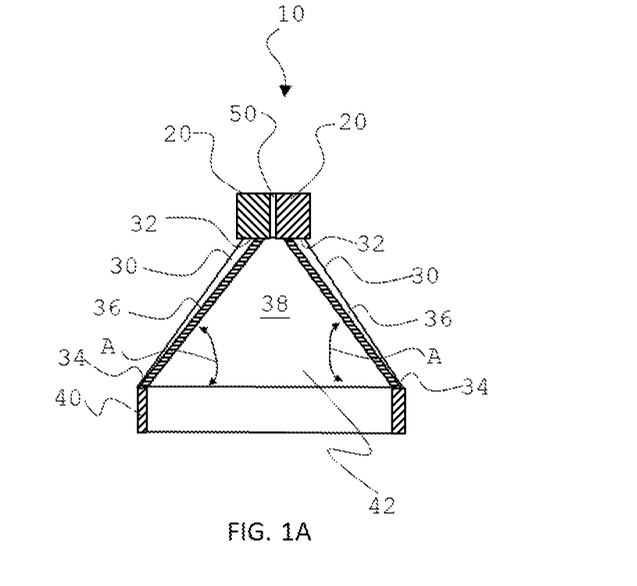
FIG. 1A is a sectional view of one embodiment with 2 gripping lips of the object holding device.

Referring to FIG. 1 and FIG. 1A, one of the embodiments of an object holding device 10 comprises at least two gripping lips 20, at least one supporting wall 30 for each of said at least two gripping lips 20, one base 40, wherein said at least two gripping lips 20 are respectively opposed to one another, wherein each of said at least two gripping lips 20 further comprises a first end 22 and a second end 24 in opposite to said first end 22, wherein said at least two gripping lips 20 are touched against one another, wherein said first end 22 of one of said at least two gripping lips 20 is affixed with said second end 24 of another said at least two gripping lips 20, wherein said at least two gripping lips 20 form at least one slit 50 between one another, wherein each said at least one supporting wall 30 has a first side 32 attached with one of said at least two gripping lips 20 and has a second side 34 extending to said base 40, wherein each said at least one supporting wall 30 has at least one crease 36 formed in the approximately middle of said at least one supporting wall 30 for each of said at least two gripping lips 20, wherein said at least one crease 36 of said at least one supporting wall 30 extends from said first side 32 of said at least one supporting wall 30 to said second side 34 of said at least one supporting wall 30, wherein said crease 36 forms an angle Å of about 30 degrees to about 90 degrees relatively to said base 40, wherein said at least two gripping lips 20, said at least one supporting wall 30 of each of said at least two gripping lips 20, and said base 40 together define a space 42, wherein said at least two gripping lips 20 and said at least one supporting wall 30 for each of said at least two gripping lips 20 are made of resilient flexible materials such as but not limited to rubber, synthetic rubber, plastic, or thermoplastic, synthetic resign, engineered polymer products, or combination thereof.

Also referring to FIG. 1 and FIG. 1A, one of embodiments of the object holding device 10 has an optional least one lateral wall 38, wherein said at least one lateral wall 38 connected with the said at least two gripping lips 20, at least one of said supporting wall 30, and said base 40.

Figure 2:
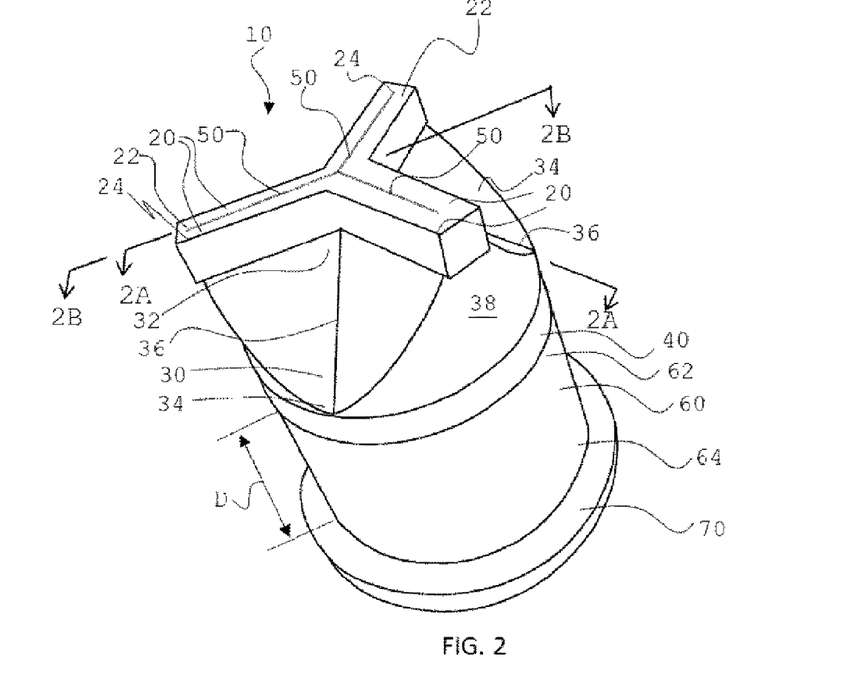
FIG. 2 is a perspective view of one embodiment with 3 gripping lips of the object holding device.
Figure 2A:
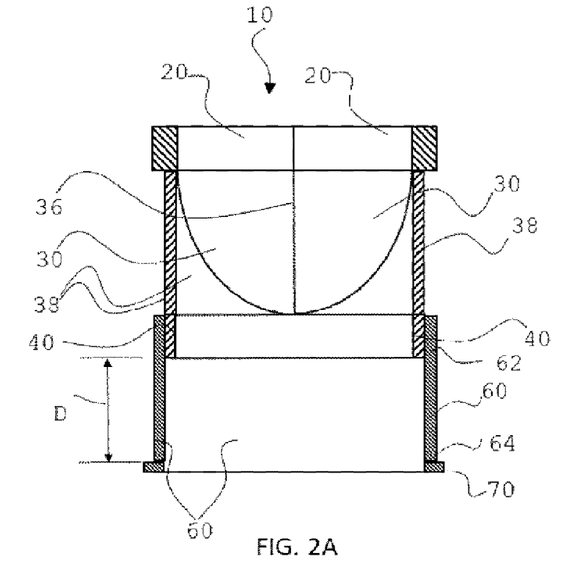
FIG. 2A is a sectional view of one embodiment with 3 gripping lips of the object holding device.
Figure 2B:
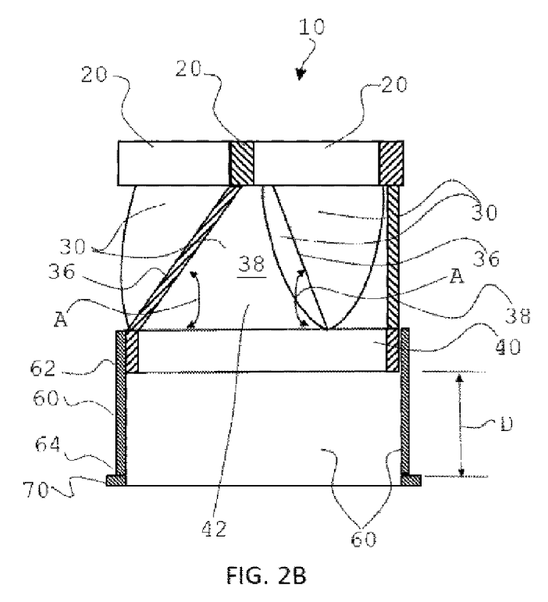
FIG. 2B is another sectional view of one embodiment with 3 gripping lips of the object holding device.

Referring to FIG. 2, FIG. 2A, FIG. 2B, one of preferred embodiment of an object holding device 10 comprises three gripping lips 20, three supporting walls 30, one base 40, wherein three gripping lips 20 are respectively opposed to one another, wherein each of said three gripping lips 20 further comprises a first end 22 and a second end 24 in opposite to said first end 22, wherein said three gripping lips 20 are touched against one another, wherein said first end 22 of one of said three gripping lips 20 is affixed with said second end 24 of another of said three gripping lips 20, wherein said three gripping lips 20 forms three slits 50 in an shape of letter Y, wherein each of said three supporting walls 30 further comprises a first side 32 attached with one of said three gripping lips 20 and a second side 34 extending to said base 40, wherein each of said three supporting walls 30 further comprises at least one crease 36 formed in the approximately middle of each said supporting wall 30, wherein said at least one crease 36 extends from said first side 32 of said supporting wall 30 to said second side 34 of said supporting wall 30, wherein said at least one crease 36 forms an angle Å of about 30 degrees to about 90 degrees relatively to said base 40, three supporting walls 30, and said base 40 together define a space 42, wherein said three gripping lips 20 and said three supporting walls 30 are made of resilient flexible material, such as but not limited to rubber, synthetic rubber, plastic, or thermoplastic, synthetic resign, engineered polymer products, or combination thereof.

Also referring to FIG. 2, FIG. 2A, and FIG. 2B, the base 40 further comprises an optional extension wall 60 and a footer 70, wherein said extension wall 60 has one first wall end 62 and one second wall end 64, wherein said first wall end 62 of said extension wall 60 is coupled with said base 40 and said second wall end 64 of said extension wall 60 extends a predetermined length D to a footer 70. The predetermined length D is varied with the length of the object to be deposited in the object holding device 10.

Figure 3:
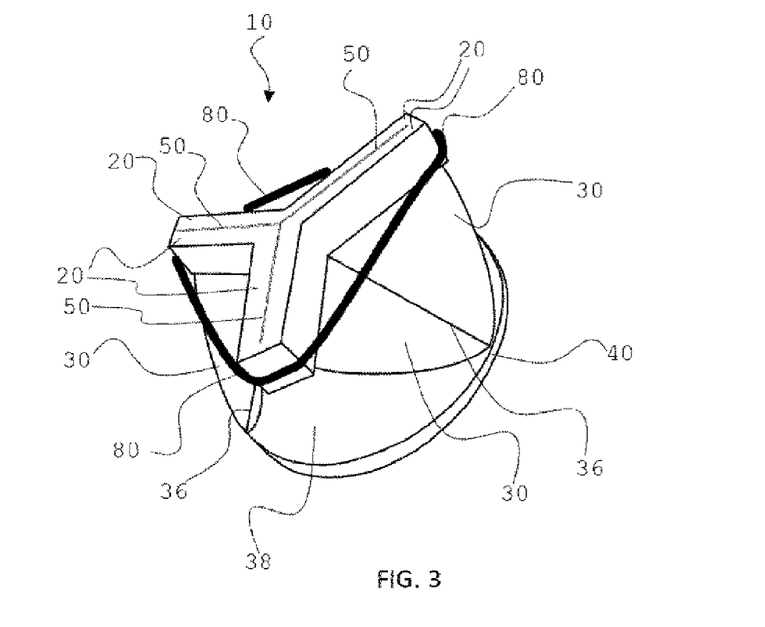
FIG. 3 is a perspective view of one embodiment with 3 gripping lips and tension ring of the object holding device.

Referring to FIG. 3, one of the embodiments of an object holding device 10 comprises a tension ring 80, wherein said tension ring 80 is made of resilient flexible material, and wherein said tension ring 80 encircles said three gripping lips 20. The flexible material can be such as but not limited to rubber, synthetic rubber, plastic, or thermoplastic, synthetic resign, engineered polymer products, metal springs, or combination thereof. The tension ring 80 will push the three gripping lips 20 toward to the center of the Y shape formed by the three slits 50. Therefore, the gripping lips 20 will touch closely with one another to grip object 90 disposed through the three slits 50.

Figure 4:
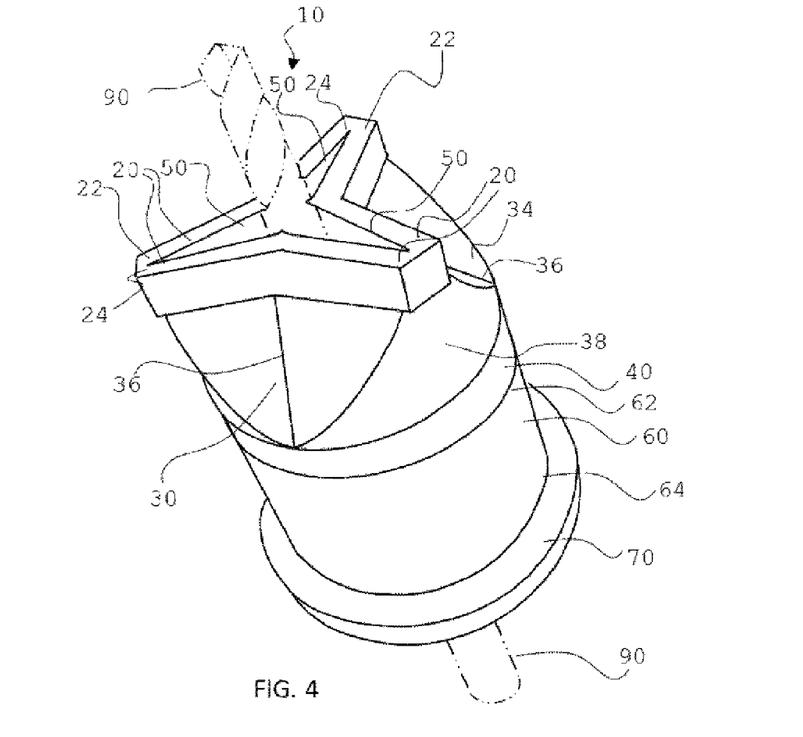
FIG. 4 is a perspective view of one embodiment of the object holding device with an object inserted.
Figure 4A:
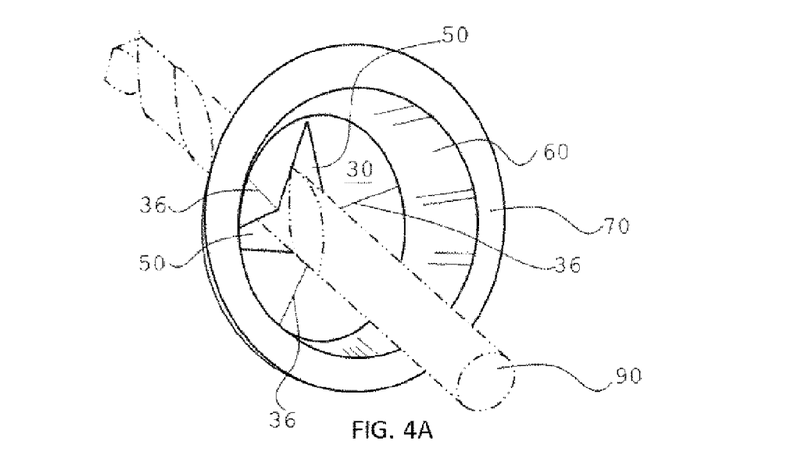
FIG. 4A is a perspective view from the bottom of one embodiment of the object holding device with an object inserted.

Referring to FIG. 4 and FIG. 4A, in one preferred embodiment of the object holding device 10, an object 90 is disposed in the object holding device 10. The object 90 is inserted through the three slits 50 formed by the three gripping lips 20. The three slits 50 will open in the center of Y shape formed by the three slits 50 but gradually closed when approaching to the first end 22 and the second end 24 of the gripping lips 20. The supporting walls 30 will push back the gripping lips 20 to the center since the crease 36 in an angle Å will push back the gripping lips 20 to the center of the Y shape. Therefore, the force generated by the combination of gripping lips 20, the supporting walls 30, and the creases 36 will grip object 90 firmly in the object holding device 10. However, the object 90 is also able to be moved out of the object holding device 10. Since the resilient flexible material of gripping lips 20, the supporting walls 30, and the creases 36 is flexible, pulling or pushing the object 90 disposed among the gripping lips 20 will cause the gripping lips 20 deformed and able to release the object 90.

Figure 5:
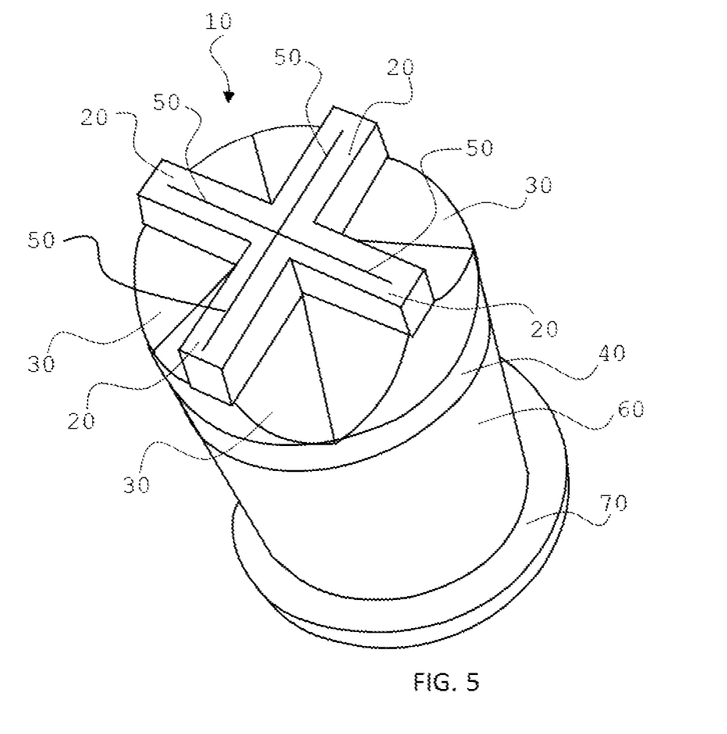
FIG. 5 is a perspective view of one embodiment with 4 gripping lips of the object holding device.

Referring to FIG. 5, one of the embodiments of the object holding device 10 has four gripping lips 20, four supporting walls 30, and one base 40.

Figure 6:
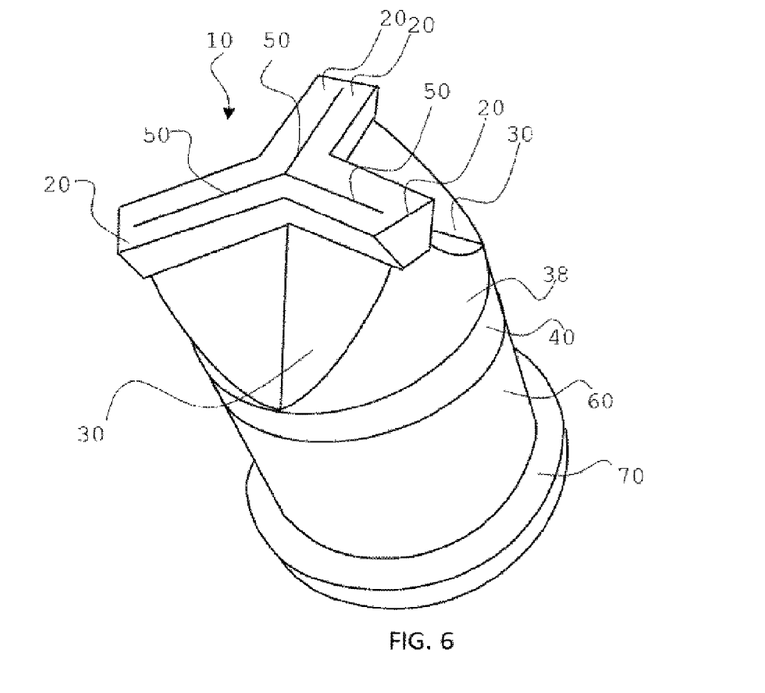
FIG. 6 is a perspective view of one embodiment with 4 gripping lips that are trapezoidal prism shape of the object holding device.

Referring to FIG. 6, one of the embodiments of the object holding device 10 has gripping lips 20 is in a shape of polygonal prism as trapezoid prism.

Figure 7:
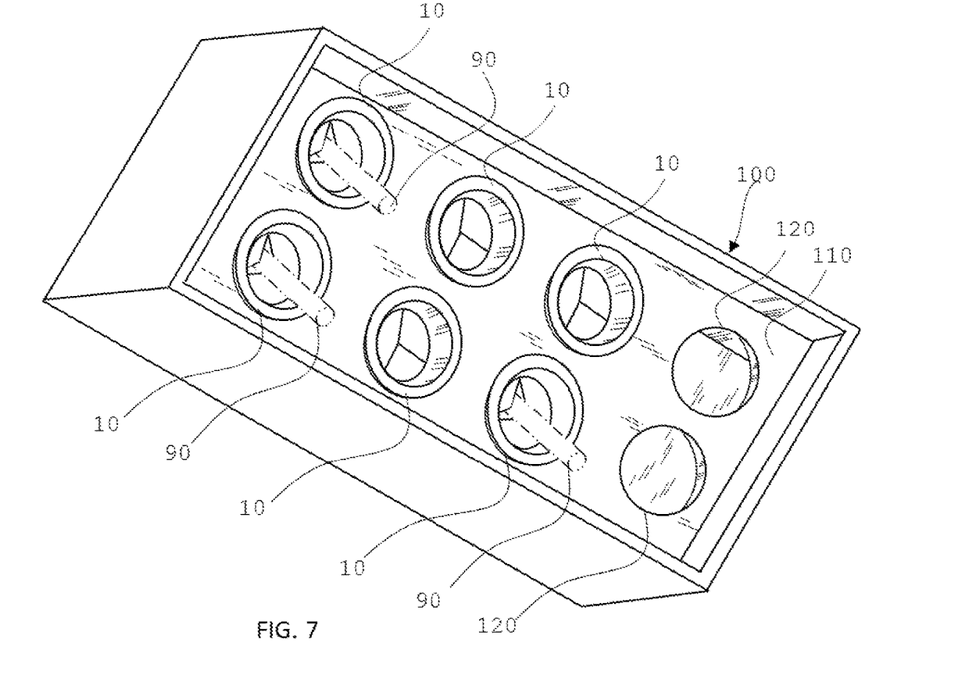
FIG. 7 is a perspective view of one embodiment of the object holding device in a case.

Referring to FIG. 7, one of the embodiments of the object holding device 10 is in a case 100, wherein said case 100 further comprises a rack 110, wherein a plurality of holes 120 are formed through said rack 110, wherein each of said plurality of holes 120 has a size in where said object holding device 10 can be substantially fitted, and wherein at least one said object holding device 10 is fitted in to one of said plurality of holes 120. The object 90 can be inserted and disposed among the slits 50 of the object holding device 10.

What are claimed:

1. An object holding device holding at least one object comprising:
   at least two gripping lips,
   one supporting wall for each of said at least two gripping lips,
   one base,
   wherein said at least two gripping lips are respectively opposed to one another,
   wherein each of said at least two gripping lips further comprises a first end and a second end in opposite to said first end,
   wherein said at least two gripping lips are touched against one another,
   wherein said first end of one of said at least two gripping lips is affixed with said second end of another said at least two gripping lips,
   wherein said at least two gripping lips form one slit between one another,
   wherein each said one supporting wall has a first side attached with one of said at least two gripping lips and has a second side extending to said base,
   wherein each of said one supporting wall for each of said at least two gripping lips has at least one crease formed in the approximately middle of said one supporting wall for each of said at least two gripping lips,
   wherein said at least one crease of said one supporting wall for each of said at least two gripping lips extends from said first side of said one supporting wall to said second side of said one supporting wall,
   wherein said crease forms an angle of about 30 degrees to about 90 degrees relatively to said base,
   wherein said at least two gripping lips, said one supporting wall for each of said at least two gripping lips, and said base together define a space to receive said at least one object,
   wherein said at least two gripping lips and said one supporting wall for each of said at least two gripping lips are made of resilient flexible material,
   wherein said at least one object can be disposed into said space,
   wherein a portion of said at least one object can be disposed through said slit formed between said at least two gripping lips, and wherein said at least two gripping lips holding a portion of said object between said slit.

2. The object holding device of claim 1,
   wherein each of said at least two gripping lips is a polygonal prism.

3. The object holding device of claim 1 further comprising a tension ring,
   wherein said tension ring is made of resilient flexible material, and
   wherein said tension ring encircles said at least two gripping lips.

4. The object holding device of claim 1, further comprising an extension wall,
   wherein said extension wall has one first end and one second end, wherein said first end of said extension wall is coupled with said base and said second end of said extension wall extends a predetermined length.

5. The object holding device of claim 1 further comprising one footer,
   wherein said base is coupled with said one footer.

6. The object holding device of claim 1, further comprising one extension wall,
   one footer,
   wherein said extension wall has one first end and one second end, and
   wherein said first end of said extension wall is coupled with said base and said second end of said extension wall extends a predetermined length to said one footer.

7. The object holding device of claim 1, further comprising at least one lateral wall,
   wherein said at least one lateral wall is connected with the said at least two gripping lips, one of said supporting wall for each of said at least two gripping lips, and said base.

8. The object holding device of claim 1, further comprising a case,
   a rack,
   wherein a plurality of holes are formed through said rack,
   wherein each of said plurality of holes has a size in where said object holding device can be substantially fitted, and
   wherein at least one said object holding device is fitted in to one of said plurality of holes.

9. An object holding device holding at least one object comprising:
   three gripping lips,
   three supporting walls,
   one base,
   wherein said three gripping lips are respectively opposed to one another,
   wherein each of said three gripping lips further comprises a first end and a second end in opposite to said first end,
   wherein said three gripping lips are touched against one another, wherein said first end of one of said three gripping lips is affixed with said second end of another of said three gripping lips, wherein said three gripping lips forms three slits that collectively form a shape of a letter Y, wherein each of said three supporting walls further comprises a first side attached with one of said three gripping lips and a second side extending to said base, wherein each of said three supporting walls further comprises at least one crease formed in the approximately middle of each of said three supporting walls, wherein said at least one crease of each of said three supporting walls extends from said first side of each of said three supporting walls to said second side of each of said three supporting walls, wherein said at least one crease forms an angle of about 30 degrees to about 90 degrees relatively to said base, wherein said three gripping lips, three supporting walls, and said base together define a space to receive said at least one object, wherein said three gripping lips and said three supporting walls are made of resilient flexible material, wherein said at least one object can be disposed into said space, wherein a portion of said at least one object can be disposed through said three slits formed between said three gripping lip, and wherein said at three gripping lips hold a portion of said object among said three slits.

10. The object holding device of claim 9, wherein each of said three gripping lips is a polygonal prism.

11. The object holding device of claim 9 further comprising a tension ring, wherein said tension ring is made of resilient flexible material, and wherein said tension ring encircles said three gripping lips.

12. The object holding device of claim 9, further comprising an extension wall, wherein said extension wall has one first end and one second end, wherein said first end of said extension wall is coupled with said base and second end of said extension wall extends a predetermined length.

13. The object holding device of claim 9, further comprises one footer, wherein said base is coupled with said one footer.

14. The object holding device of claim 9, further comprising an extension wall, one footer, wherein said extension wall has one first end and one second end, and wherein said first end of said extension wall is coupled with said base and said second end of said extension wall extends a predetermined length to said one footer.

15. The object holding device of claim 9, further comprising at least one lateral wall, wherein said at least one lateral wall is connected with the said three gripping lips, at least one of said three supporting walls, and said base.

16. The object holding device of claim 9, further comprising a rack, wherein a plurality of holes are formed through said rack, wherein each of said plurality of holes has a size in where said object holding device can be substantially fitted, and wherein at least one said object holding device is fitted into one of said plurality of holes.

17. An object holding device holding at least one object comprising:

three gripping lips, three supporting walls, one base, a tension ring, an extension wall, one footer, at least one lateral wall, wherein said three gripping lips are respectively opposed to one another, wherein each of said three gripping lips further comprises a first end and a second end in opposite to said first end, wherein said three gripping lips are touched against one another, wherein said first end of one of said three gripping lips is affixed with said second end of another of said three gripping lips, wherein said three gripping lips forms slits that collectively form a shape of a letter Y, wherein each of said three supporting walls further comprises a first side attached with one of said three gripping lips and a second side extending to said base, wherein each of said three supporting walls further comprises at least one crease formed in the approximately middle of each of said three supporting walls, wherein said at least one crease of each of said three supporting walls extends from said first side of each of said three supporting walls to said second side of each of said three supporting walls, wherein said at least one crease forms an angle of about 30 degrees to about 90 degrees relatively to said base, wherein said three gripping lips, three supporting walls, and said base together define a space to receive said at least one object, wherein said three gripping lips and said three supporting walls are made of resilient flexible material, wherein said at least one object can be disposed into said space, wherein a portion of said at least one object can be disposed through said three slits formed between said three gripping lips, wherein said three gripping lips hold a portion of said object among said three slits, wherein each of said three gripping lips is a polygonal prism, wherein said tension ring is made of resilient flexible material, wherein said tension ring encircles said three gripping lips, wherein said extension wall has one first wall end and one second wall end, wherein said first wall end of said extension wall is coupled with said base and said second wall end of said extension wall extends a predetermined length to said one footer, and wherein said at least one lateral wall is connected with the said three gripping lips, at least one of said three supporting walls and said base.

* * * * *